United States Patent
Chen et al.

(10) Patent No.: US 10,480,227 B1
(45) Date of Patent: Nov. 19, 2019

(54) HINGE DEVICE WITH DUAL SHAFT

(71) Applicant: LIANHONG ART CO., LTD., Taoyuan (TW)

(72) Inventors: Chia-Hui Chen, Taoyuan (TW); Tzu-Yu Lin, Taoyuan (TW); Chiao-Fang Chang, Taoyuan (TW)

(73) Assignee: LIANHONG ART CO., LTD., Taoyuan (TW)

( * ) Notice: Subject to any disclaimer, the term of this patent is extended or adjusted under 35 U.S.C. 154(b) by 0 days.

(21) Appl. No.: 16/440,928

(22) Filed: Jun. 13, 2019

(51) Int. Cl.
*E05D 3/12* (2006.01)
*G06F 1/16* (2006.01)

(52) U.S. Cl.
CPC ............ *E05D 3/122* (2013.01); *G06F 1/1681* (2013.01); *Y10T 16/541* (2015.01)

(58) Field of Classification Search
CPC .. E05D 3/12; E05D 3/122; E05D 3/14; E05D 3/06; H04M 1/022; Y10T 16/541; G06F 1/1681
USPC .......................................................... 16/354
See application file for complete search history.

(56) References Cited

U.S. PATENT DOCUMENTS

| | | | | |
|---|---|---|---|---|
| 6,574,837 B2 * | 6/2003 | Jantschek | ............. | E04B 2/7431 16/371 |
| 6,735,823 B2 * | 5/2004 | Pelletier | ................. | E05D 3/122 16/251 |
| 7,063,042 B2 * | 6/2006 | Dillingham | ............. | E05D 3/122 16/354 |
| 7,416,364 B2 * | 8/2008 | Yodock, III | .......... | E01F 15/083 256/13.1 |
| 8,861,211 B2 * | 10/2014 | Yeh | ........................ | G06F 1/1681 361/755 |
| 9,268,372 B1 * | 2/2016 | Hsu | ........................ | G06F 1/1681 |
| 9,348,450 B1 * | 5/2016 | Kim | ........................ | G06F 1/1681 |
| 9,428,946 B2 * | 8/2016 | Martinez Garcia | ..... | E05D 3/122 |
| 9,435,410 B2 * | 9/2016 | Yeh | ........................ | G06F 1/1681 |
| 9,442,533 B2 * | 9/2016 | Lee | ........................ | G06F 1/1618 |
| 9,464,471 B1 * | 10/2016 | Chen | .................... | G06F 1/1681 |
| 9,518,414 B1 * | 12/2016 | Chen | .................... | G06F 1/1681 |
| 9,528,308 B2 * | 12/2016 | Cho | ........................ | E05D 3/122 |
| 9,677,308 B1 * | 6/2017 | Chen | ........................ | E05D 3/18 |
| 9,759,242 B2 * | 9/2017 | Hsu | ............................ | G06F 1/16 |
| 9,829,928 B2 * | 11/2017 | Chiu | .................... | G06F 1/1669 |
| 10,015,897 B1 * | 7/2018 | Hong | .................. | H05K 5/0217 |
| 10,036,189 B2 * | 7/2018 | Chen | ........................ | E05D 3/14 |
| 10,303,223 B2 * | 5/2019 | Park | ........................ | E05D 3/122 |
| 10,337,224 B1 * | 7/2019 | Shah | .................... | E05D 11/105 |
| 10,352,354 B1 * | 7/2019 | Hsu | ........................ | F16C 11/04 |
| 10,365,686 B2 * | 7/2019 | Tucker | .................. | G06F 1/1618 |

(Continued)

*Primary Examiner* — Jeffrey O'Brien
(74) *Attorney, Agent, or Firm* — Guice Patents PLLC

(57) ABSTRACT

A dual-shaft hinge device including a base and two rotatable plates connected to two lateral sides of the base. Each of the first rotatable plate and the second rotatable plate have a semicircular portion on which a plurality of teeth are disposed. A first rotatable rod and a second rotatable rod are disposed in the base. First gear teeth are disposed at one end of the first rotatable rod and mesh with the teeth of the first rotatable plate, and second gear teeth are disposed at one end of the second rotatable rod and mesh with the teeth of the second rotatable plate. An even number of gear rods are disposed in the base and mutually meshed with each other. Two lateral plates are connected to the base to position the aforementioned elements to the base.

10 Claims, 6 Drawing Sheets

(56) References Cited

U.S. PATENT DOCUMENTS

| | | | | |
|---|---|---|---|---|
| 2005/0050686 A1* | 3/2005 | Kurokawa | ............ | G06F 1/1618 |
| | | | | 16/354 |
| 2017/0235337 A1* | 8/2017 | Vic | ............. | E05D 3/12 |
| | | | | 361/679.55 |
| 2019/0025887 A1* | 1/2019 | Seo | ............. | G06F 1/1652 |
| 2019/0166703 A1* | 5/2019 | Kim | ............. | H05K 5/0017 |

\* cited by examiner

HINGE DEVICE WITH DUAL SHAFT

BACKGROUND OF THE INVENTION

Field of the Invention

The invention relates to a hinge device, and more particularly to a hinge device with dual shafts rotating together.

Description of the Related Art

At present, a common hinge structure is used on an electronic device having a folding function, such as a notebook computer or a general mobile phone of clamshell type through which a pivoting function is generated for the user, whereby the electronic device is adjusted to an proper applicable state of use through a pivot structure.

Nowadays, more and more electronic devices are designed to provide a folding screen, so that the hinge is more important in such a design concept. The function of the hinge provides maximal viewing area of the screen and the minimal space occupied by the electronic device.

However, most of the conventional hinges are designed in a single-axis rotation manner, so that the panel cannot be completely folded and thus results increases or damage to the panel when such a hinge is mounted on such a folding screen, which is the drawbacks of the current hinge design.

BRIEF SUMMARY OF THE INVENTION

In view of the above-mentioned drawbacks, an object of the present invention is to provide a dual-shaft hinge device, which is designed to reduce the possible damage of a display panel during the fold of the electronic device with dual screens through the structural design of a plurality of rotatable rods.

The present invention provides a dual-shaft hinge device. The hinge device in accordance with an exemplary embodiment of the invention includes a base comprising a main body having a top surface and two opposite lateral surfaces, two fixing seats disposed on the lateral surfaces with one of the fixing seats misaligned with the other one of the fixing seat, and two stopping bars disposed on the lateral surfaces with one of the stopping bars misaligned with the other of the stopping bars, wherein each of the stopping bars has a top plane lower than the top surface; a first rotatable plate connected to one of the lateral surfaces and comprising a first semi-circular portion at one end thereof, a first surface and a plurality of first teeth disposed on the first semi-circular portion, wherein a plurality of first through holes are formed on the first surface near another end thereof; a second rotatable plate connected to the other of the lateral surfaces and comprising a second semi-circular portion at one end, a second surface and a plurality of second teeth disposed on the second semi-circular portion, wherein a plurality of second through holes are formed on the second surface; a first rotatable rod extending through the main body and comprising a plurality of third teeth disposed on an outer periphery thereof and near one end thereof, wherein the third teeth meshing with the first teeth of the first rotatable plate; a second rotatable rod extending through the main body and comprising a plurality of fourth teeth disposed on an outer periphery thereof and near one end thereof, wherein the fourth teeth meshing with the second teeth of the second rotatable plate; an even number of gear rods disposed in the main body and mutually meshed, wherein one of the gear rods meshes with the first rotatable rod and another one of the gear rod meshes with the second rotatable rod; and a plurality of lateral plates connected to the lateral surfaces of the main body to position the first rotatable rod, the second rotatable rode and the gear rods.

A detailed description is given in the following embodiments with reference to the accompanying drawings.

DETAILED DESCRIPTION OF THE INVENTION

Figure 1:
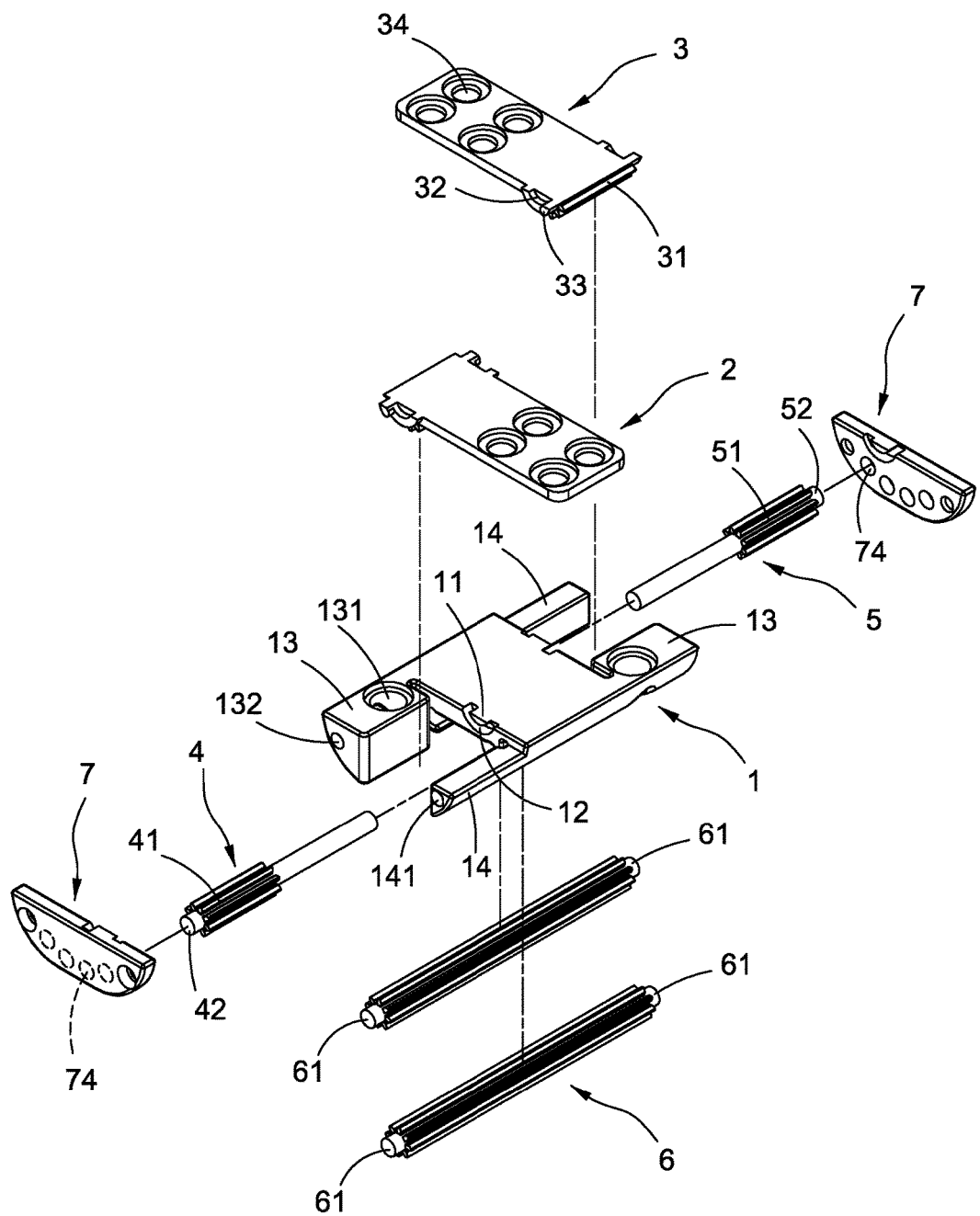
FIG. 1 is an exploded perspective view of a hinge device of the present invention.

Referring to FIG. 1, a dual-shaft hinge device of the present invention includes a base 1. The base 1 is I-shaped and includes a main body, and each of two lateral surfaces of the main body of the base 1 have a post 11 respectively. The posts 11 disposed on the lateral surfaces are arranged in a misalignment manner. A first curved groove is formed on the periphery of each of the posts 11. A fixing seat 13 is disposed on one side of the post 11, and the fixing seats 13 are also disposed in a misalignment manner. A through hole 131 is formed on the top surface of each fixing seat 13. A locking hole 132 is defined on a lateral side of the seat 13. A stopping bar 14 is on the other side of each posts 11, and the top surface of the stopping bar 14 is a plane and slightly lower than a top surface of the base 1. A fixing hole 141 is defined on an end surface of the stopping bar 14.

Figure 2:
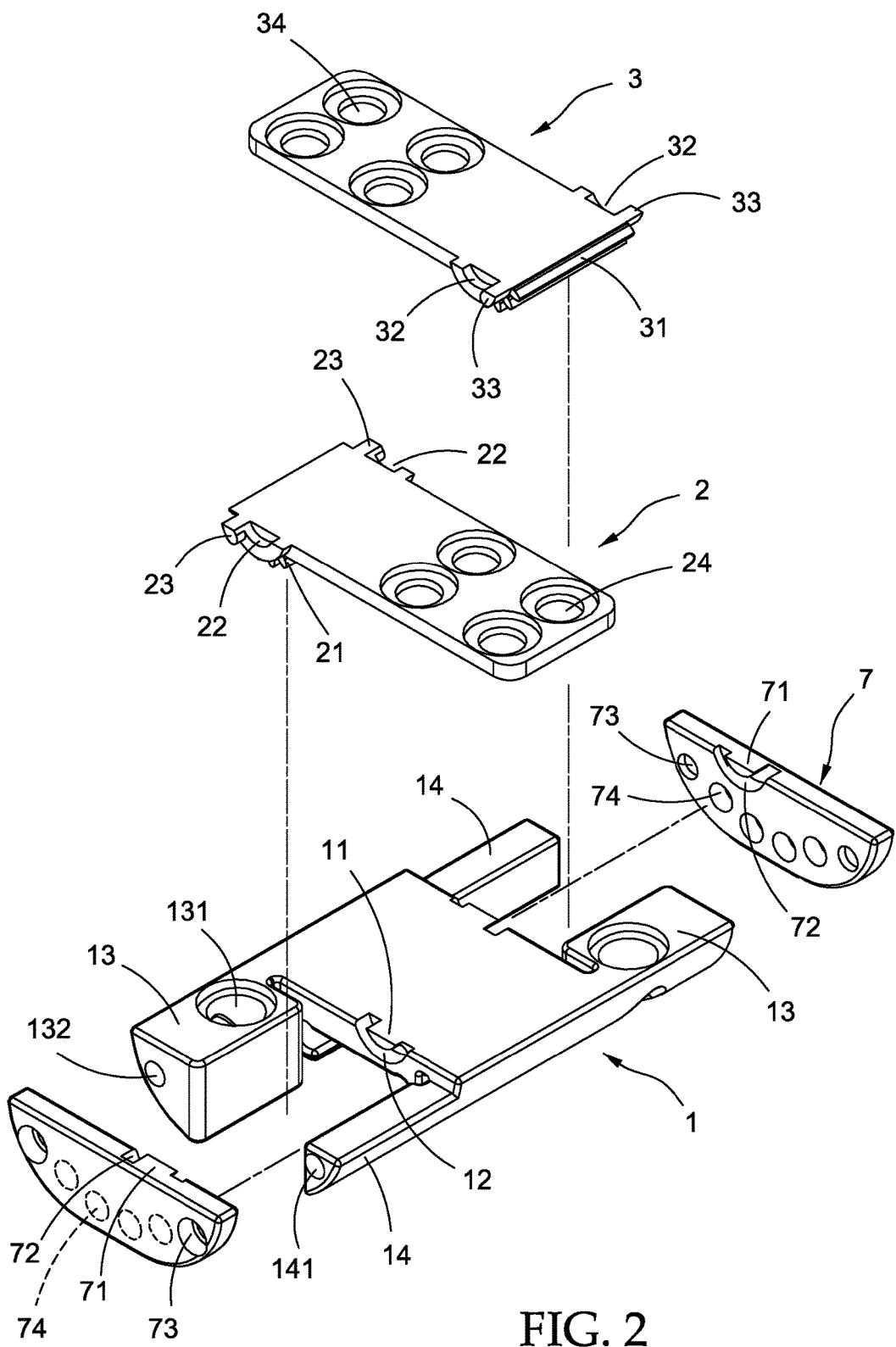
FIG. 2 is a partially enlarged view of a hinge device of the present invention.

Referring to FIG. 1 again, the lateral surfaces of the base 1 are respectively connected to a first rotatable plate 2 and a second rotatable plate 3, so that the first rotatable plate 2 and the second rotatable plate 3 can be rotated in opposite directions on the base 1 and finally closed to the base 1. Referring to FIG. 2, one end of the first rotatable plate 2 has a semicircular portion at one end. A plurality of first teeth 21 are disposed on a periphery of the semicircular portion. Two end sides of the semicircular portion are respectively provided with a pair of recesses 22, and a guiding post 23 is adjacent to each of the recesses 22, so that the post 11 of the base 1 is inserted into the recess 22 and the guiding post 23 is directly introduced into the first curved groove 12. The other end plate of the first rotatable plate 2 is provided with a plurality of first through holes 24 extending through the first rotatable plate 2. The second rotatable plate 3 is disposed opposite to the first rotatable plate 2. The second rotatable plate 3 includes a semicircular portion at one end, and a plurality of second teeth 31 disposed on a periphery of the semicircular portion. A pair of recesses 32 are respectively provided on two lateral sides of the semicircular portion, and a guiding post 33 is disposed adjacent to the recess 32 such that the post 11 of the base on the other lateral surface is inserted into the recess 32 and the guiding post 33 is just introduced into the first curved groove 12. The other end plate of the plate 3 is provided with a plurality of second through holes 34 extending through the second rotatable plate 3.

Referring to FIG. 1, a first rotatable rod 4 and a second rotatable rod 5 are disposed on the base 1. The first rotatable rod 4 extends through the main body of the base 1 from one lateral side of the main body of the base 1 and is coupled and linked to the first rotatable plate 2. A plurality of first gear teeth 41 are disposed on a periphery near one end of the first rotatable rod 4, and the first gear teeth 41 correspondingly mesh with the first teeth 21 of the first rotatable plate 2, thereby causing the first rotatable plate 2 to mesh with the first rotatable rod 4. The first rotatable rod 4 has a first connecting end 42 disposed at a top end of the first rotatable rod 4. The second rotatable rod 5 extends through the main body of the base 1 on one side of base 1 and meshes with the second rotatable plate 3. A plurality of second gear teeth 51 are disposed near one end of the second rotatable rod 5, and the second gear teeth 51 correspondingly mesh with the second teeth 31 of the second rotatable plate 3 cause the second rotatable plate 3 to mesh with the second rotatable rod 5. A connecting end 52 is provided at the top end of the second rotatable rod 5.

Figure 3:
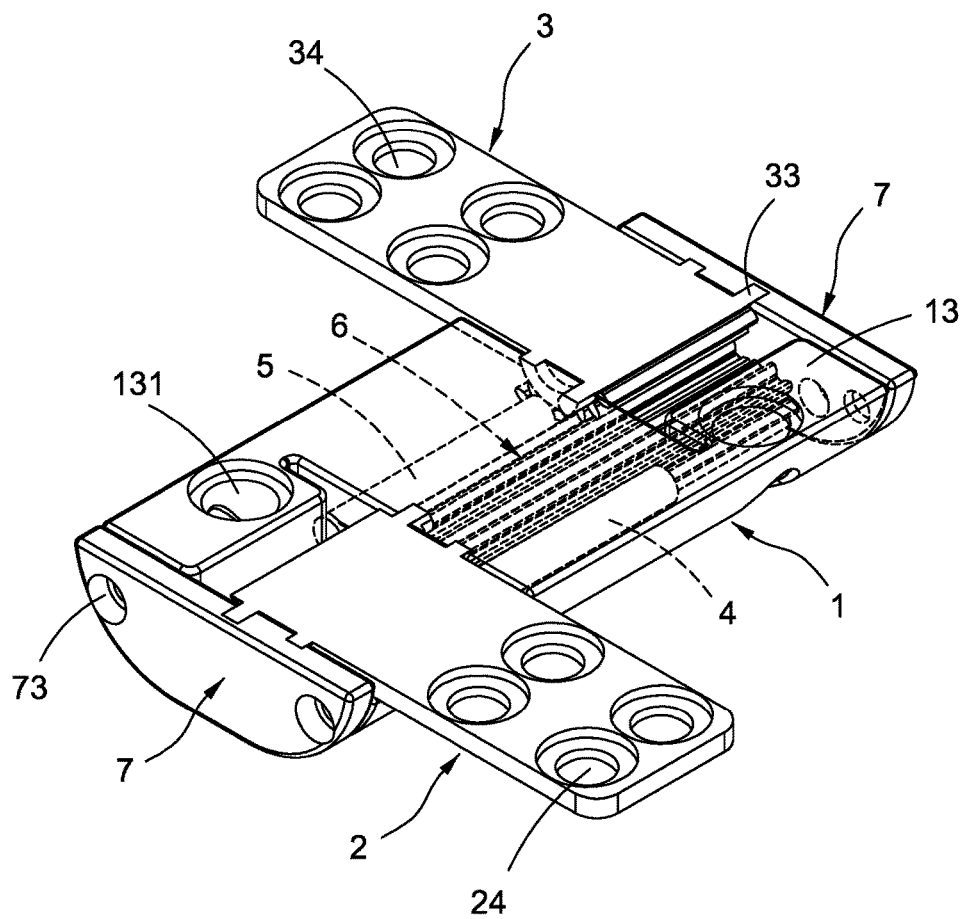
FIG. 3 is a perspective view of a hinge device of the present invention.

Referring to the FIG. 1, an even number of gear rods 6 are disposed on the main body 1, and the gear rods 6 mesh with each other, and at the same time, the first rotatable rod 4 meshes with one of the gear rods 6 and the second rotatable rod 5 meshes with another of the gear rods 6 so that the gear rods 6, the first rotatable rod 4 and the second rotatable rod 5 are connected to each other. Two ends of each rotatable rods 6 respectively have a pair of joining ends 61. Finally, Two opposite sides of the base 1 are correspondingly connected to two lateral plates 7 respectively. Each of the lateral plates 7 includes a fixing post 71 disposed on a top surface of the lateral plates 7 and a second curved groove 72 adjacent to the fixing post 71. The fixing post 71 of each lateral plate 7 corresponds to the recesses 22 and 32 on the other side of the first rotatable plate 2 and the second rotatable plate 3. The guiding posts 23 and 33 are just introduced into the corresponding second curved groove 72, so that when the first rotatable plate 2 and the second rotatable plate 3 are rotated, they move in a predetermined moving trace. Each of the lateral plates 7 includes a lock-fix holes 73 respectively disposed on an inner side of both side plates 7, and the lock-fix holes 73 extend through the side plates 7, and the lock-fix holes 73 respectively correspond to the locking hole 132 and the fixing hole 141 and are inserted a locking element (not shown), thereby fixing the lateral plate 7 to the main seat body 1. A plurality of positioning holes 74 are respectively defined on each lateral plate 7. The connecting ends 42 and 52 of the first rotatable rod 4 and the second rotatable rod 5, and the joining end 61 of each of the gear rods 6 are inserted into the positioning holes 74. thereby positioning the first rotatable rod 4, the second rotatable rod 5 and the respective gear rods 6 to the main body of the base 1. The perspective view of the hinge device is shown in FIG. 3.

Figure 4:
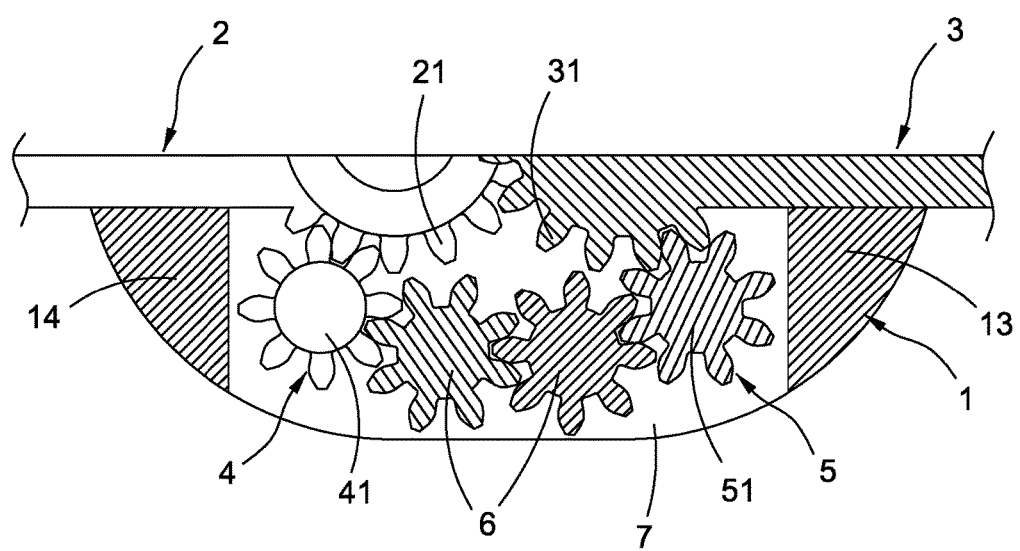
FIG. 4 is a cross section of a hinge device of the present invention when the hinge device is operated.
Figure 5:
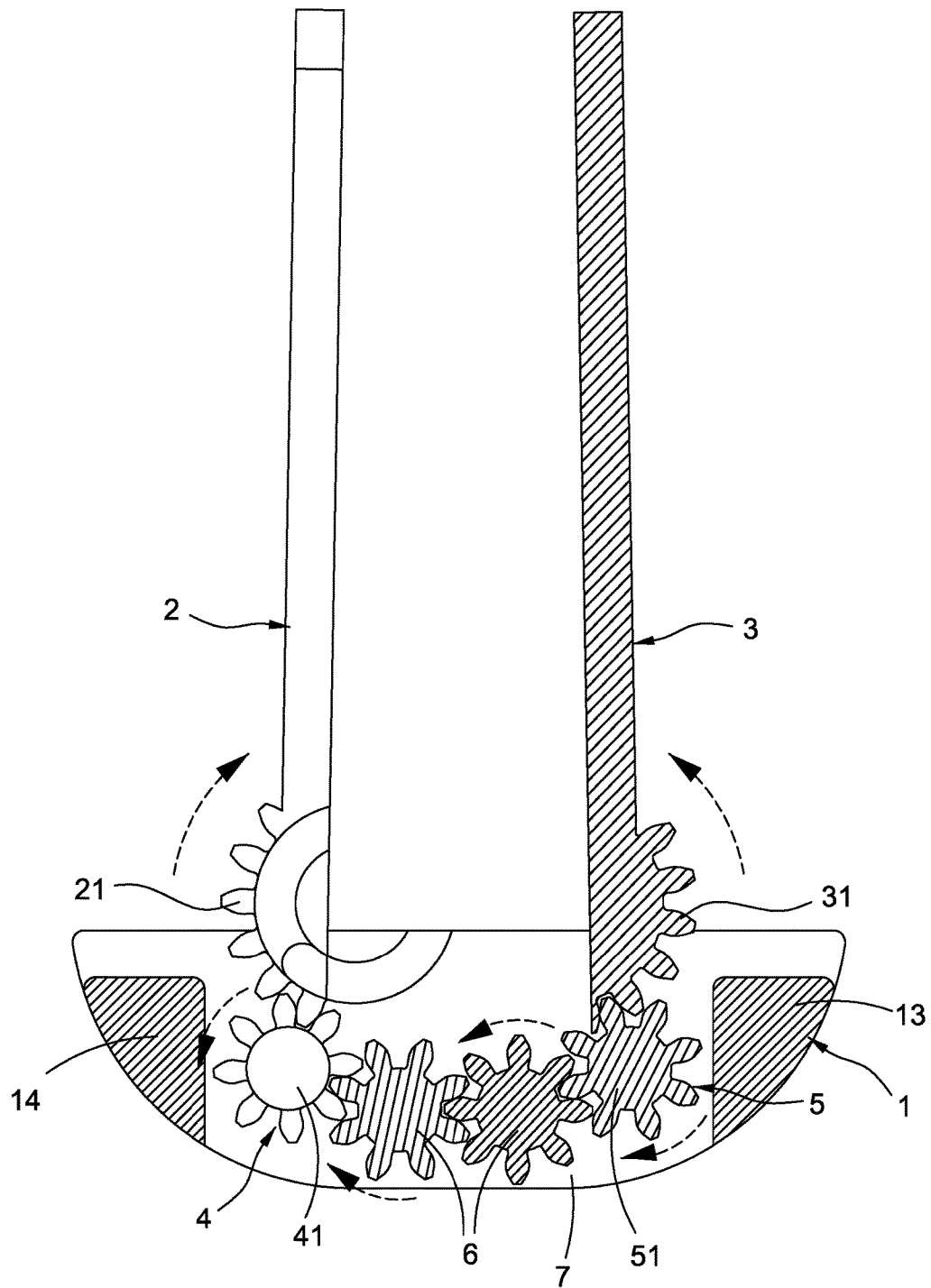
FIG. 5 is another cross section of a hinge device of the present invention when the hinge device is operated.
Figure 6:
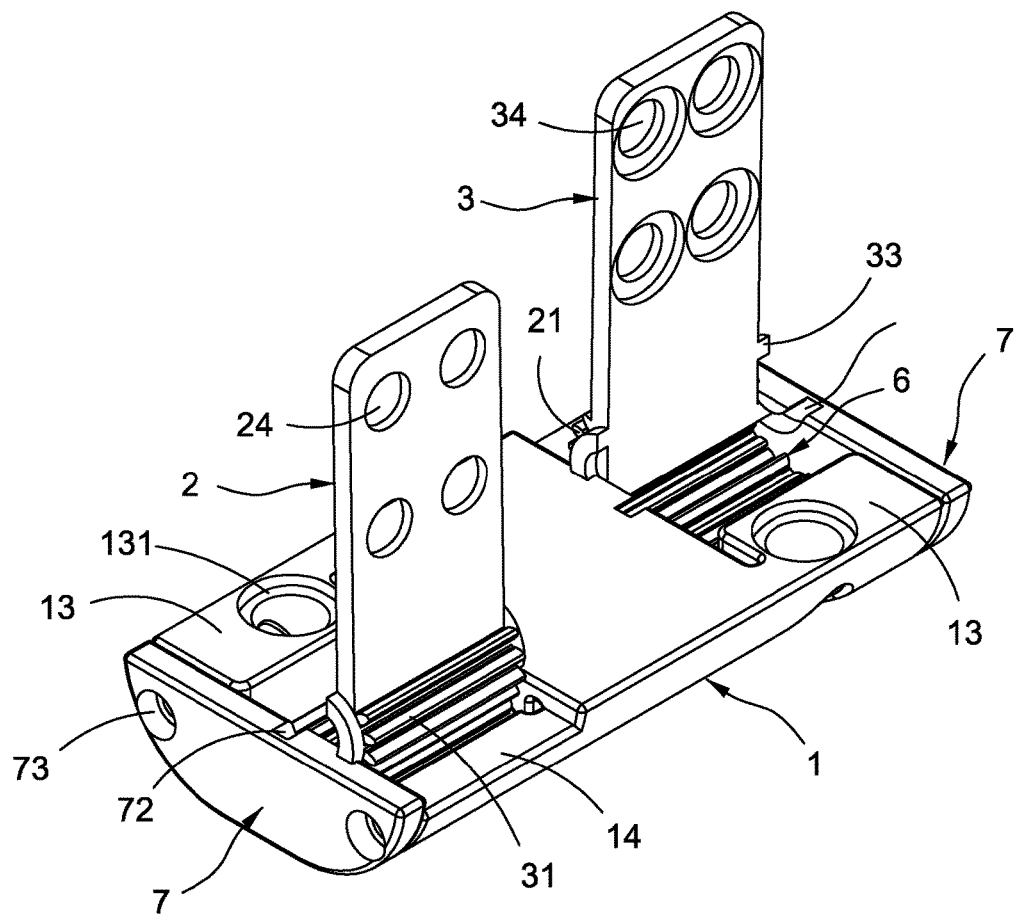
FIG. 6 is a perspective view of a hinge device of the present invention when the hinge device is operated.

Referring to the FIGS. 4 and 5, which are schematic cross-sectional views of the operation of the hinge device of the present invention. As shown in FIG. 4, the hinge device of the present invention is in an open state, and the first rotatable plate 2 and the second rotatable plate 3 are coplanar, and the first rotatable plate 2 and the second rotatable plate 3 are attached to the stopping bars 14 of the base 1. As shown in FIG. 5, when the first rotatable plate 2 or the second rotatable plate 3 is operated for rotation, the first rotatable plate 2 or the second rotatable plate 3 are rotated to drive the first rotatable rod 4 or the second rotatable rod 5 to rotate, and the gear rods 6 transmit the rotation, so that the gear rods 6 rotate the counterpart of the second rotatable plate 3 or the first rotatable plate 2 at the other end. As shown in the figures, the first rotatable plate 2 or the second rotatable plate 3 rotates independently as rotating in a dual-axis manner, and finally they rotate to a state shown in FIG. 6. The schematic diagram of operation is shown in FIG. 6.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hinge device, comprising:
   a base comprising a main body having a top surface and two opposite lateral surfaces, two fixing seats disposed on the lateral surfaces with one of the fixing seats misaligned with the other one of the fixing seats, and two stopping bars disposed on the lateral surfaces with one of the stopping bars misaligned with the other of the stopping bars, wherein each of the stopping bars has a top plane lower than the top surface;
   a first rotatable plate connected to one of the lateral surfaces and comprising a first semi-circular portion at one end thereof, a first surface and a plurality of first teeth disposed on the first semi-circular portion, wherein a plurality of first through holes are formed on the first surface near another end thereof;
   a second rotatable plate connected to the other of the lateral surfaces and comprising a second semi-circular portion at one end, a second surface and a plurality of second teeth disposed on the second semi-circular portion, wherein a plurality of second through holes are formed on the second surface;
   a first rotatable rod extending through the main body and comprising a plurality of first gear teeth disposed on an outer periphery thereof and near one end thereof, wherein the first gear teeth meshing with the first teeth of the first rotatable plate;
   a second rotatable rod extending through the main body and comprising a plurality of second gear teeth disposed on an outer periphery thereof and near one end thereof, wherein the second gear teeth meshing with the second teeth of the second rotatable plate;
   an even number of gear rods disposed in the main body and mutually meshed, wherein one of the gear rods meshes with the first rotatable rod and another one of the gear rod meshes with the second rotatable rod; and
   a plurality of lateral plates connected to the lateral surfaces of the main body to position the first rotatable rod, the second rotatable rod and the gear rods.

2. The hinge device as claimed in claim 1, wherein the base is I-shaped.

3. The hinge device as claimed in claim 2, wherein the base further comprises two posts disposed on the lateral surfaces with misalignment and two first curved grooves formed on the lateral surfaces and adjacent to the posts.

4. The hinge device as claimed in claim 3, wherein the first rotatable plate further comprises two first recesses formed on two ends of the first semi-circular portion respectively and two first guiding posts adjacent to the first recesses respectively, and the second rotatable plate comprises two second recesses formed on two ends of the second semi-circular portion and two second guiding posts adjacent to the second recesses respectively, wherein the posts of the base are inserted into one of the first recesses and one of the second recesses respectively, and the first guiding post and the second guiding post are slidably disposed in the first curved grooves.

5. The hinge device as claimed in claim 4, wherein the plurality of lateral plates comprise two fixing posts disposed on two ends of a top surface thereof and two second curved grooves adjacent to the fixing posts, wherein the fixing posts are inserted into another one of the first recesses and another one of the second recesses, and the guiding posts are slidably disposed in the second curved grooves.

6. The hinge device as claimed in claim 1, wherein each of the fixing seats has a through hole formed on a top surface thereof and a locking hole formed on a lateral surface thereof, and each of the stopping bars has a fixing hole formed on an end surface thereof.

7. The hinge device as claimed in claim 6, wherein each of the lateral plates has two lock-fix holes formed through an inner side thereof, and the lock-fix holes correspond to the locking holes and the fixing holes.

8. The hinge device as claimed in claim 1, wherein the first rotatable rod has a first connecting end disposed at one end thereof, and the second rotatable rod has a second connecting end disposed at one end thereof.

9. The hinge device as claimed in claim 8, wherein each of the lateral plates has a plurality of positioning holes formed on an inner side thereof, and the first connecting end and the second connecting end are inserted into the positioning holes.

10. The hinge device as claimed in claim 9, wherein each of the gear rods has two joining ends formed at two ends thereof, and the joining ends are inserted into the positioning holes of the lateral plates.

* * * * *